United States Patent [19]
Scott

[11] Patent Number: 5,661,963
[45] Date of Patent: Sep. 2, 1997

[54] CITRUS HARVESTER

[75] Inventor: Phillip Ray Scott, Madera, Calif.

[73] Assignee: FMC Corporation, Chicago, Ill.

[21] Appl. No.: 426,389

[22] Filed: Apr. 21, 1995

[51] Int. Cl.⁶ .................................................. A01D 46/24
[52] U.S. Cl. ........................... 56/328.1; 56/15.7; 56/330; 56/DIG. 19
[58] Field of Search ........................... 56/328.1, 330, 56/331, 340.1, DIG. 19, 15.1, 15.2, 15.7, 15.8

[56] References Cited

U.S. PATENT DOCUMENTS

| | | | |
|---|---|---|---|
| 3,561,205 | 2/1971 | Baker | 56/328.1 |
| 4,860,529 | 8/1989 | Peterson et al. | 56/330 |
| 4,907,400 | 3/1990 | Roden | 56/DIG. 22 |
| 5,027,593 | 7/1991 | Korthuis et al. | 56/330 X |
| 5,339,612 | 8/1994 | Scott | 56/330 |
| 5,355,667 | 10/1994 | Scott | 56/330 |
| 5,421,146 | 6/1995 | Visser | 56/328.1 |

*Primary Examiner*—Terry Lee Melius
*Assistant Examiner*—Heather Shackelford
*Attorney, Agent, or Firm*—Michael B. K. Lee; Douglas W. Rudy

[57] ABSTRACT

A harvester for harvesting fruits from plants such as trees or bushes. The harvester uses a shaker head, which rotationally oscillates a vertical brush. A shaker frame is able to rotate around a wide arch which allows more than half the tree to be reached in a single pass. The other half of the tree may be reached by the brush in a pass in the opposite direction. The harvester also uses lifts to raise the brush to a height suitable for harvesting fruits from trees.

5 Claims, 5 Drawing Sheets

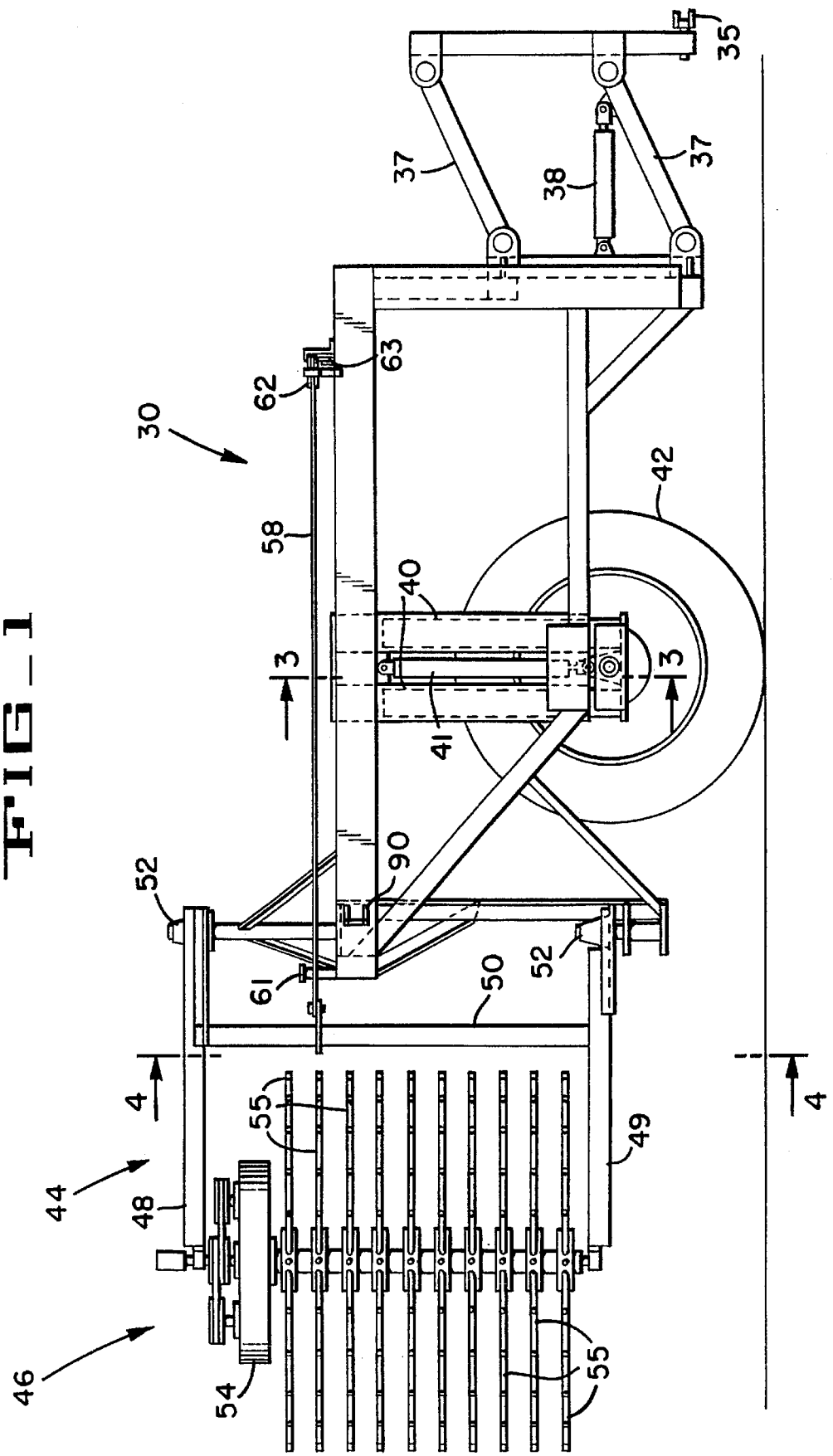

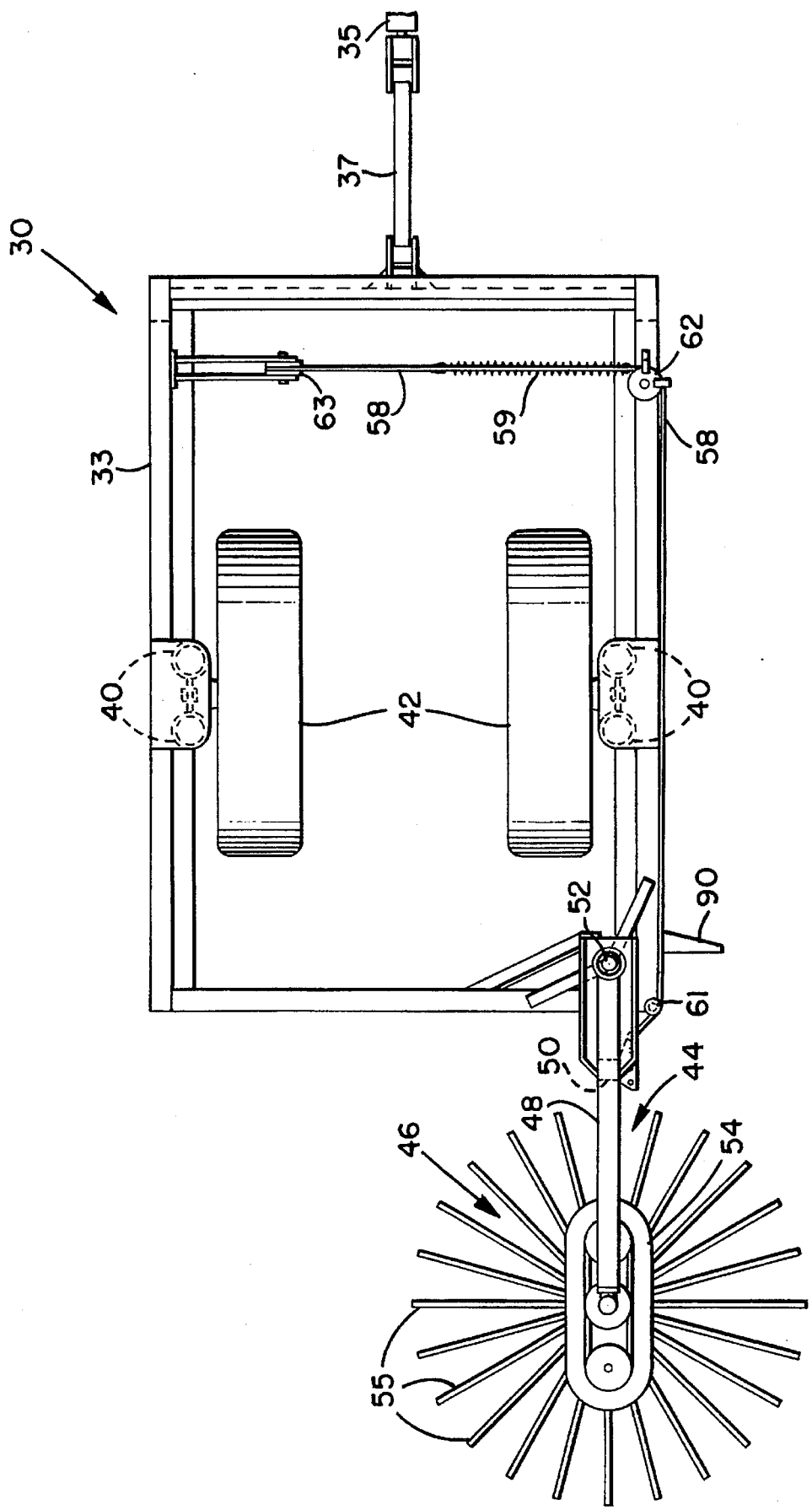

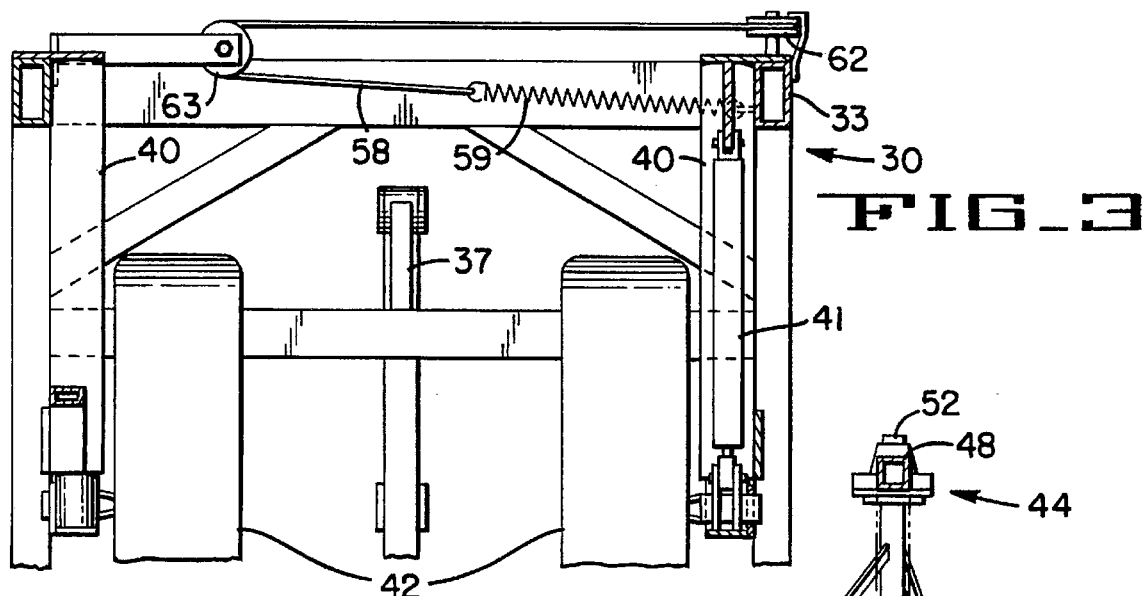
FIG_3
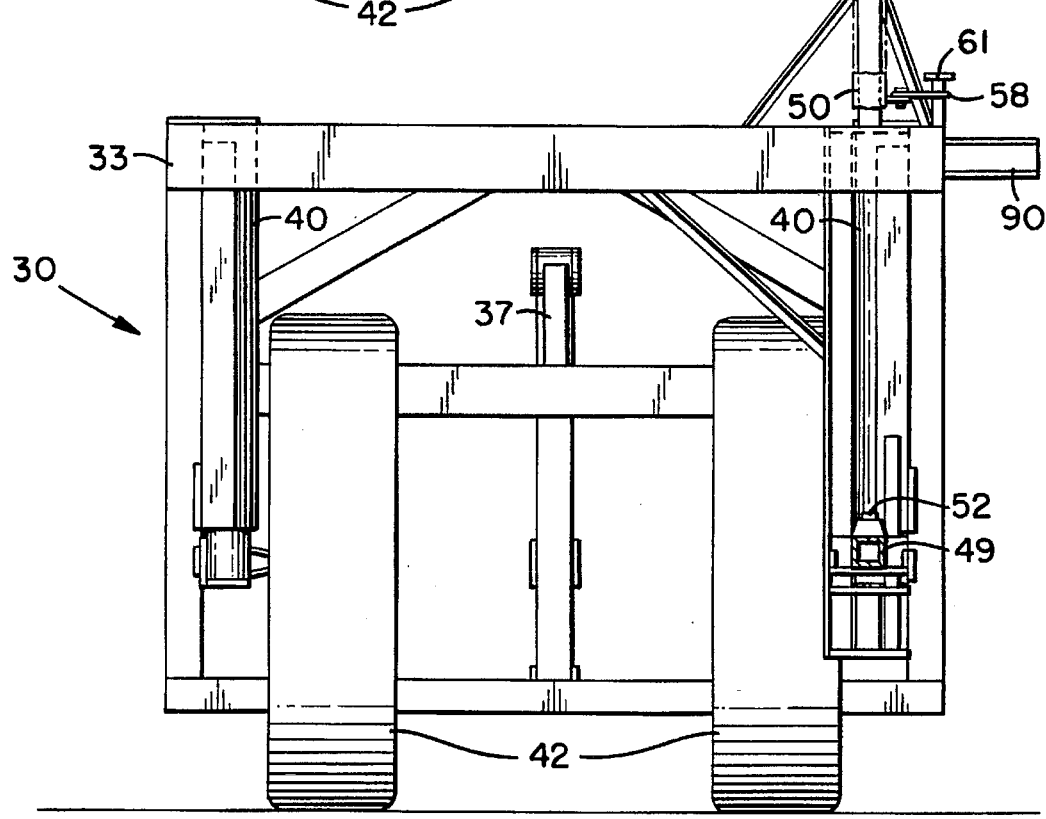
FIG_4

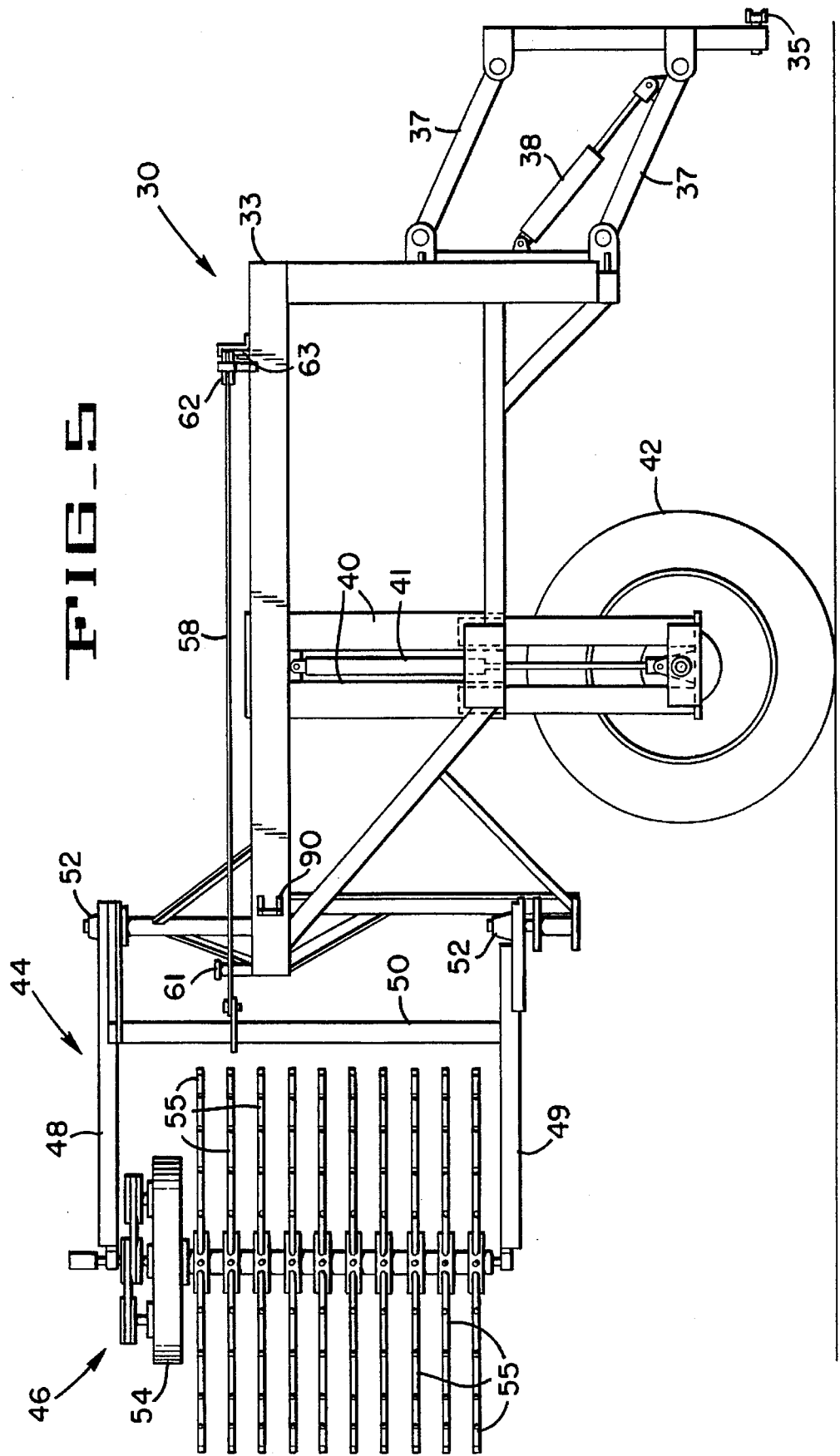

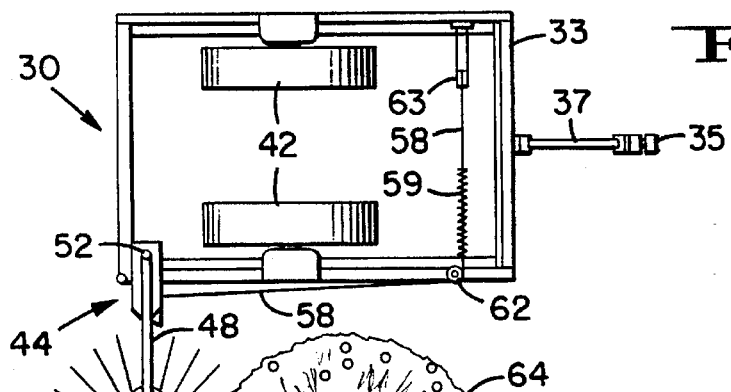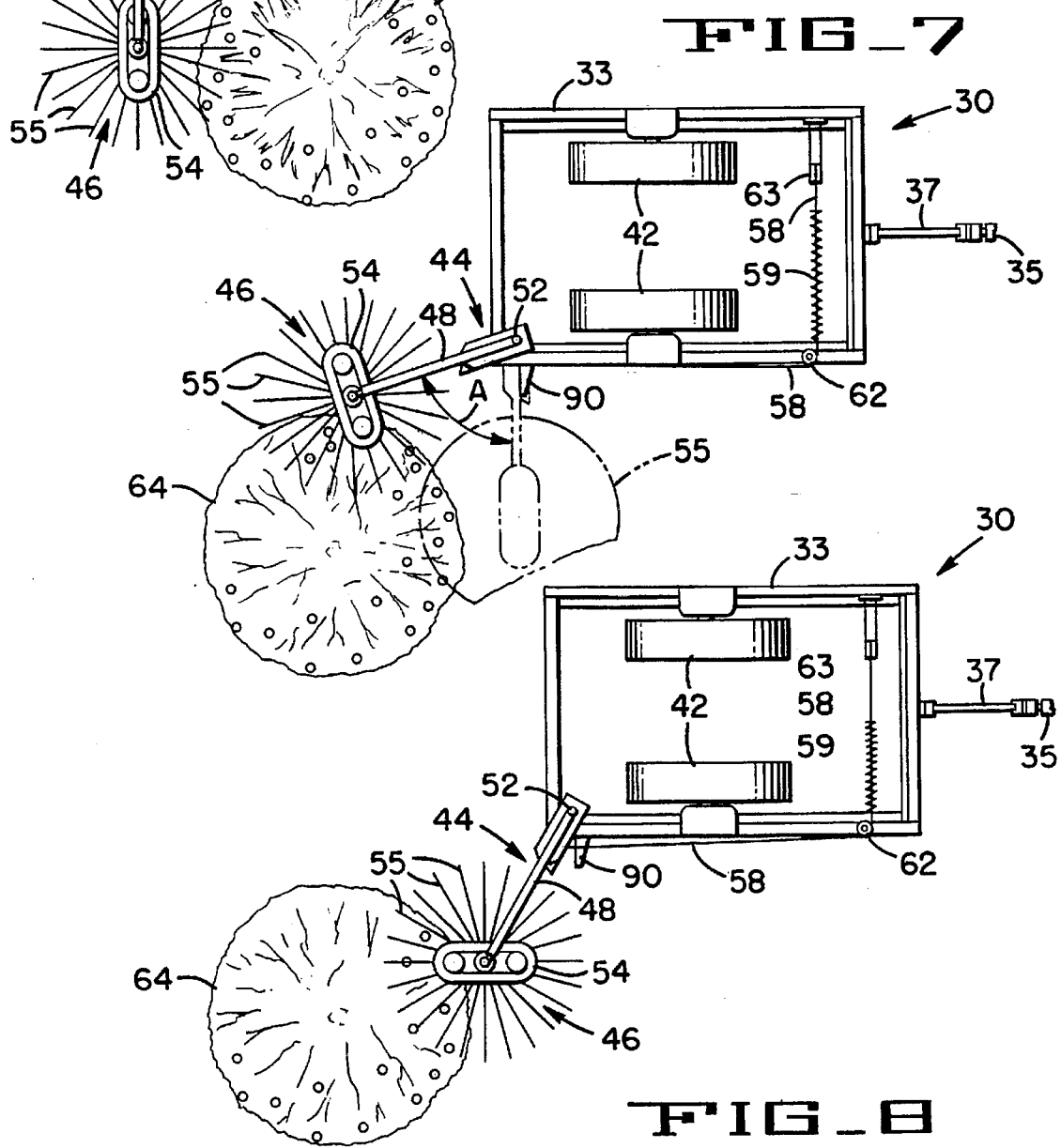

CITRUS HARVESTER

In the past, forced balanced shakers and vertical brushes have been used to harvest nuts and berries from bushes and vines such as the coffee harvester disclosed in U.S. Pat. No. 4,341,062 incorporated by reference.

The present invention relates to mobile harvesters for harvesting fruits from trees or bushes such as citrus trees, where the fruit is far from the ground. The inventive harvester uses a vertical rotary brush which is able to reach more than half of the tree in a single pass. The invention has a lift which raises the brush to a height which allows the harvesting of the fruit from trees.

FIG. 1 is a side view of the inventive harvester in a lowered position.

FIG. 2 is a top view of the harvester shown in FIG. 1.

FIG. 3 is a cross-sectional view of the harvester shown in FIG. 1 along lines 3—3.

FIG. 4 is a cross-sectional view of the harvester shown in FIG. 1 along lines 4—4.

FIG. 5 is a side view of the harvester shown in FIG. 1, in a raised position.

FIG. 6 is a top view of the harvester shown in FIG. 5, with a tree on the side of the harvester.

FIG. 7 is a top view of the harvester shown in FIG. 5, with a tree slightly behind and on the side of the harvester.

FIG. 8 is a top view of the harvester shown in FIG. 5, with a tree more behind and on the side of the harvester.

Having reference to the harvester 30 (FIGS. 1 to 4) of the present invention utilizes a main frame 33. In this embodiment, the main frame 33 is attached to a hitch 35, by a parallelogram mounting 37. A first hydraulic cylinder 38 is connected to the parallelogram mounting 37. The main frame 33 is mounted on a pair of wheels 42. Sliding mounts 40 are mounted between the wheels 42 and the main frame 33. Second hydraulic cylinders 41 are mounted between the main frame 33 and the wheels 42. A shaker frame 44 is mounted on the main frame 33. A shaker head 46 is mounted on the shaker frame 44. The shaker frame 44 comprises a top bar 48 and a bottom bar 49 which are parallel, and a support bar 50 connected between and supporting the top bar 48 and the bottom bar 49. The top bar 48 and bottom bar 49 connect the shaker frame 44 to the main frame 33 by hinges 52, so that the shaker frame 44 may swivel about a vertical axis through the hinges 52. The shaker head 46 comprises a forced balanced shaker 54 and a vertical brush 55. A spring loaded cable 58 is connected to the shaker frame 44 at the support bar 50. The top view of FIG. 2 of the harvester 30 better illustrates how the spring loaded cable 58 is connected to the shaker frame 44. FIG. 3, which is a cross-sectional view of the harvester 30 in FIG. 1 along line 3—3, illustrates the spring 59 used to spring load the spring loaded cable 58. The spring loaded cable 58 goes from the support bar 50 to a cable support 61. The cable support 61 comprises a pole with a disk on top. From the cable support 61 the cable goes to a first pulley 62 and then to a second pulley 63 and then attaches to a first end of the spring 59. A second end of the spring is connected to the main frame 33.

In operation, an operator attaches the hitch 35 to a tractor (not shown). Hydraulic connections may also be attached to the tractor's power system to provide power to the first hydraulic cylinder 38, the second hydraulic cylinders 41 and the shaker head 46. The operator drives the tractor, which pulls the harvester 30 to the location of a tree. The operator may at that time raise the harvester 30. The harvester 30 is raised by causing the first hydraulic cylinder 38 and the second hydraulic cylinders 41 to extend. FIG. 5 shows a harvester in a raised position. The second hydraulic cylinders 41 are extended raising the main frame 33 above the wheels 42. The first hydraulic cylinder 38 is also extended allowing the main frame 33 to rise, while keeping the hitch 35 at a set level. The raised harvester 30 causes the vertical brush 55 to be raised allowing the vertical brush 55 to contact fruits that are higher. In this embodiment the vertical brush 55 may contact fruits that are higher than 12 feet.

In a raised position, the harvester 30 is pulled so that it is adjacent to a tree, as shown in FIG. 6. The spring 59 is in a fully contracted position causing the shaker frame 44 to be substantially perpendicular to the side of the harvester, allowing the vertical brush 55 to reach the front of the tree 64. A mechanical stop 90 is used to stop the movement of the shaker frame 44. As the harvester 30 is pulled past the tree 64 so that the tree 64 is slightly behind the harvester 30, the tree 64 puts force on the vertical brush 55, causing the vertical brush 55 to push the shaker frame 44 back, behind the harvester 30, causing the spring 59 to extend, as shown in FIG. 7. The spring 59 helps to maintain the force of the vertical brush 55 against the tree 64. This allows the vertical brush 55 to reach one side of the tree 64. Once the harvester 30 is sufficiently past the tree 64, the spring 59 causes the shaker frame 44 to again move to be more perpendicular to the side of the harvester 30, allowing the vertical brush 55 to be in contact with the back of the tree 64, as shown in FIG. 8. So in one pass, at least one half of the tree is harvested by the harvester 30. The harvester 30 may pass in the opposite direction on the other side of the tree 64 to harvest all sides of the tree 64. As the harvester 30 passes the tree 64 the shaker frame 44 rotates an angle A. In this embodiment, the angle A through which the shaker frame 44 rotates as the harvester passes the tree 64 is greater than 60°, allowing the vertical brush 55 to contact more than half the outer surface area of the tree 64.

In other preferred embodiments, other means may be used besides a cable and spring, such as a hydraulic cylinder, to provide tension to the shaker frame, and allow the shaker frame to move from substantially perpendicular to the side of the harvester to behind the harvester. Other shaker heads may also be used instead of a forced balance shaker. In the specification and claims, vertical is defined as a direction that is substantially perpendicular to a level surface.

Although the best modes contemplated for carrying out the present invention has been herein shown and described, it will be understood that modification and variation may be made without departing from what is regarded to be the subject matter of the invention.

What is claimed is:

1. An apparatus for harvesting fruits from bushes and trees, comprising:

a main frame, which is moved in a forward direction;

a plurality of wheels supporting the main frame;

a shaker head with a vertical brush;

a shaker frame mechanically connected to the shaker head;

a hinge connecting the shaker frame to the main frame, wherein the hinge allows the shaker frame to move from a side of the main frame to a rearward part of the main frame; and means for applying a force to the shaker frame to bias the shaker frame to the side of the main frame.

2. The apparatus as claimed in claim 1, wherein the hinge allows the shaker frame to rotate through an angle greater than 60° as the shaker frame rotates from a side of the main frame to a rearward part of the main frame.

3. The apparatus as claimed in claim 1, further comprising:

a hitch for attaching the main frame to a tractor;

a parallelogram mounting mechanically connected between the hitch and the main frame;

a first cylinder mechanically connected to the parallelogram mounting;

a plurality of sliding mounts, each sliding mount is mechanically connected between a wheel of the plurality of wheels and the main frame; and a plurality of second cylinders, wherein each second cylinder is mechanically connected between a wheel of the plurality of wheels and the main frame.

4. A method of harvesting fruits from plants, comprising the steps of:

providing a harvester with a shaker frame holding a shaker head with a vertical shaker brash, wherein the shaker frame is tensioned to extend to a first side of the harvester;

drawing the harvester next to a plant on a first side of the plant, so that the harvester travels in a forward direction, and so that the vertical shaker brush contacts the front of the plant, and so that the plant is on the first side of the harvester;

drawing the harvester further in the forward direction so that the brush contacts the first side of the plant; and drawing the harvester past the plant so that the brush contacts the back of the plant.

5. The method as recited in claim 4, further comprising the steps of:

drawing the harvester next to the plant on a second side of the plant, so that the harvester travels in a reverse direction, and so that the vertical shaker brush contacts the back of the plant;

drawing the harvester further in the reverse direction so that the brush contacts the second side of the plant, which is positioned on the first side of the harvester; and drawing the harvester past the plant so that the brush contacts the front of the plant, wherein the brush has contacted all sides of the plant.

* * * * *